United States Patent [19]
Kamper

[11] Patent Number: 5,999,176
[45] Date of Patent: Dec. 7, 1999

[54] METHOD TO PROVIDE A SINGLE SCROLLING CONTROL FOR A MULTI-WINDOW INTERFACE

[75] Inventor: Robert Julian Kamper, Round Rock, Tex.

[73] Assignee: International Business Machines Corporation, Armonk, N.Y.

[21] Appl. No.: 08/835,130

[22] Filed: Apr. 4, 1997

[51] Int. Cl.⁶ .................................................. G06F 3/00
[52] U.S. Cl. .......................................... 345/341; 345/348
[58] Field of Search ................................... 345/341, 340, 345/339, 348, 326–338, 342–347, 113, 112; 707/10

[56] References Cited

U.S. PATENT DOCUMENTS

| | | | |
|---|---|---|---|
| 4,896,291 | 1/1990 | Gest et al. | 364/900 |
| 5,073,771 | 12/1991 | Satta et al. | 340/721 |
| 5,142,669 | 8/1992 | Inoue et al. | 395/341 |
| 5,187,776 | 2/1993 | Yanker | 345/356 |
| 5,263,134 | 11/1993 | Paal et al. | 395/341 |
| 5,333,247 | 7/1994 | Gest et al. | 395/138 |
| 5,392,388 | 2/1995 | Gibson | 395/341 |
| 5,452,413 | 9/1995 | Blades | 345/341 |
| 5,485,174 | 1/1996 | Henshaw et al. | 345/341 |
| 5,528,259 | 6/1996 | Bates et al. | 345/121 |
| 5,548,703 | 8/1996 | Berry et al. | 345/356 |
| 5,586,243 | 12/1996 | Barber et al. | 395/326 |
| 5,838,320 | 11/1998 | Matthews, III | 345/341 |
| 5,859,638 | 1/1999 | Coleman et al. | 345/341 |
| 5,867,156 | 2/1999 | Beard et al. | 345/332 |
| 5,874,957 | 2/1999 | Clive et al. | 345/339 |
| 5,874,961 | 2/1999 | Bates et al. | 345/341 |

OTHER PUBLICATIONS

IBM Technical Disclosure Bulletin, vol. 37, No. 09, Sep. 1994, pp. 63–64.
IBM Technical Disclosure Bulletin, vol. 37, No. 07, Jul. 1994, p. 585.
IBM Technical Disclosure Bulletin, vol. 37, No. 02A, Feb. 1994, pp. 67–68.
IBM Technical Disclosure Bulletin, vol. 36, No. 04, Apr. 1993, pp. 399–403.
IBM Technical Disclosure Bulletin, vol. 35, No. 1A, Jun. 1992, pp. 130–132.

*Primary Examiner*—Steven P. Sax
*Attorney, Agent, or Firm*—Jeffrey S. LaBaw; Daniel E. Venglarik; Andrew J. Dillon

[57] ABSTRACT

A single scrolling control mechanism is provided for any active display window in a graphical user interface. As a different display window becomes active, a determination is made of whether the display data fits within the display window. A graphical device representing the scrolling mechanism is displayed with scrolling indicators denoting directions in which additional data may be revealed by scrolling. The scrolling indicators provide a user control for the scrolling mechanism, such that actuation of a scrolling indicator causes the display window to scroll in the indicated direction. The scrolling mechanism may be an object utilizing existing object classes and API calls for an existing operating system. The display of the scrolling indicators may be persistent (i.e. always shown) or may be contingent on whether the currently active window is scrollable. The display of scrolling indicators may be varied to visually indicate the states, including active, inactive, and in use. Other visual and auditory feedback and cues may be included in the operation of the scrolling mechanism.

35 Claims, 7 Drawing Sheets

METHOD TO PROVIDE A SINGLE SCROLLING CONTROL FOR A MULTI-WINDOW INTERFACE

BACKGROUND OF THE INVENTION

1. Technical Field

The present invention relates in general to graphical user interfaces for data processing systems and in particular to scrolling control mechanisms for graphical user interfaces. Still more particularly, the present invention relates to a single scrolling control mechanism for multiple windows in a graphical user interface.

2. Description of the Related Art

Graphical user interfaces for data processing systems are well-known, as are scrolling mechanisms for display windows in such graphical user interfaces. The most commonly employed graphical representation of a scrolling mechanism in a graphical user interface is a scroll bar, a vertical or horizontal region at the edge of a display window having oppositely facing arrows at either end and a slider in between, movable between the two ends.

Scroll bars present numerous problems to the user, particularly novice users. Scroll bars appear and disappear from the interface, depending on whether more information is available for viewing than can be displayed in a given display window. Scroll bars detract from the aesthetic appeal of a graphical user interface. Each window contains scroll bars which occupy valuable screen real estate which could be used for displaying information.

Additionally, each window has individual scroll bars which must be separately manipulated to scroll the contents of the window. Where windows overlay each other with coterminous borders, no movement of a pointing device is necessary to actuate the scroll bars when switching between windows. In such a configuration, however, the contents of separate windows may not be viewed simultaneously. On the other hand, when windows are arranged to permit simultaneous viewing of their contents, such as by "tiling" the windows or arranging them side-by-side, the scroll bars occupy different positions within the total display area. Thus, actuating the scroll bars when switching between windows requires movement of the pointing device.

Finally, scroll bars are not analogous to any real world experience, such as flipping pages in a book. A variety of contexts exist in which a graphical user interface should preferably emulate, as closely as possible, a user's real world experiences in order to render the interface more intuitive. One example is an information kiosk at a convention or a museum. In such environments, a less intuitive user interface may distract the user, at least to some extent, from the information presented. Lowered concentration on the information by the user lessens retention of the information, decreasing the effectiveness of the presentation. It would be preferable that the user interface be as transparent as possible in presenting the underlying information.

It would be desirable, therefore, to provide a scrolling mechanism for a graphical user interface which would not require movement of a pointing device when switching between noncontiguous display windows. It would further be desirable for the scrolling mechanism to emulate a real world user experience, and to provide as little distraction as possible from the information presented in a display window It would also be advantageous if the scrolling mechanism allowed the graphical user interface to utilize borderless windows.

SUMMARY OF THE INVENTION

It is therefore one object of the present invention to provide an improved graphical user interfaces for data processing systems.

It is another object of the present invention to provide an improved scrolling control mechanism for graphical user interface in data processing systems.

It is yet another object of the present invention to provide a single scrolling control mechanism for multiple windows in a graphical user interface for a data processing system.

The foregoing objects are achieved as is now described. A single scrolling control mechanism is provided for any active display window in a graphical user interface. As a different display window becomes active, a determination is made of whether the display data fits within the display window. A graphical device representing the scrolling mechanism is displayed with scrolling indicators denoting directions in which additional data may be revealed by scrolling. The scrolling indicators provide a user control for the scrolling mechanism, such that actuation of a scrolling indicator causes the display window to scroll in the indicated direction. The scrolling mechanism may be an object utilizing existing object classes and API calls for an existing operating system. The display of the scrolling indicators may be persistent (i.e. always shown) or may be contingent on whether the currently active window is scrollable. The display of scrolling indicators may be varied to visually indicate the states, including active, inactive, and in use. Other visual and auditory feedback and cues may be included in the operation of the scrolling mechanism.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
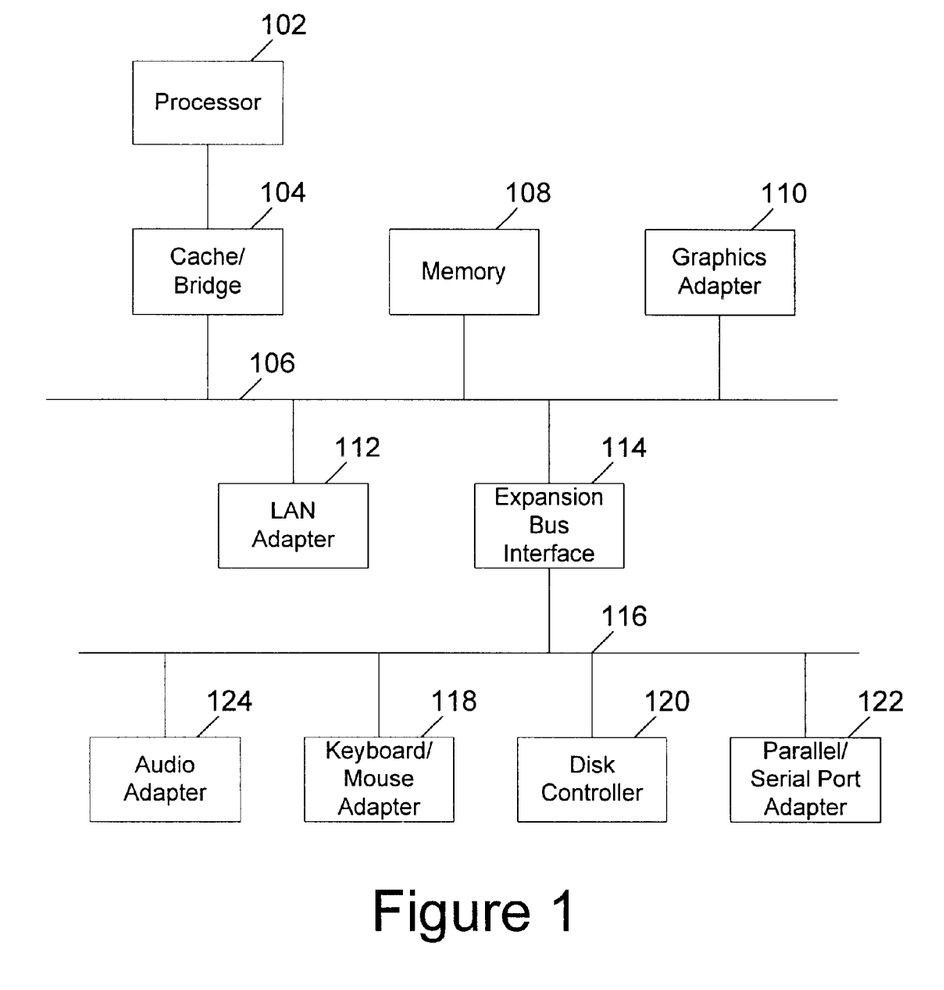
FIG. 1 depicts a data processing system in which a preferred embodiment of the present invention may be implemented.

With reference now to the figures, and in particular with reference to FIG. 1, a data processing system in which a preferred embodiment of the present invention may be implemented is depicted. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a memory-mapped graphics adapter 110.

Other memory mapped peripherals, such as local area network (LAN) adapter 112, may also be connected to local system bus 106. Expansion bus interface 114 connects local system bus 106 to input/output (I/O) bus 116. I/O bus 116 is connected to keyboard/mouse adapter 118, disk controller 120, and parallel/serial ports adapter 122. Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular. For example, other peripheral devices, such as an optical disk drive and the like, also may be used in addition or in place of the hardware depicted. The depicted example is provided for the purpose of explanation only and is not meant to imply architectural limitations with respect to the present invention.

A data processing system in accordance with a preferred embodiment of the present invention includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash., or OS/2 Warp™, a product of International Business Machines Corporation located in Armonk, N.Y., may be employed if suitably modified. The operating system is modified or created in accordance with the present invention as described below.

Referring to FIGS. 2A–2D, pictorial representations of a graphical user interface employing a single scrolling mechanism in accordance with a preferred embodiment of the present invention is illustrated. A display area 202 for a graphical user interface includes a plurality of display windows 204 and 206 containing information, including text and/or graphics, for presentation to a user. The graphical user interface also includes a graphical device 208 representing a single scrolling control mechanism for controlling the display of information within an active display window 206.

Figure 2A:
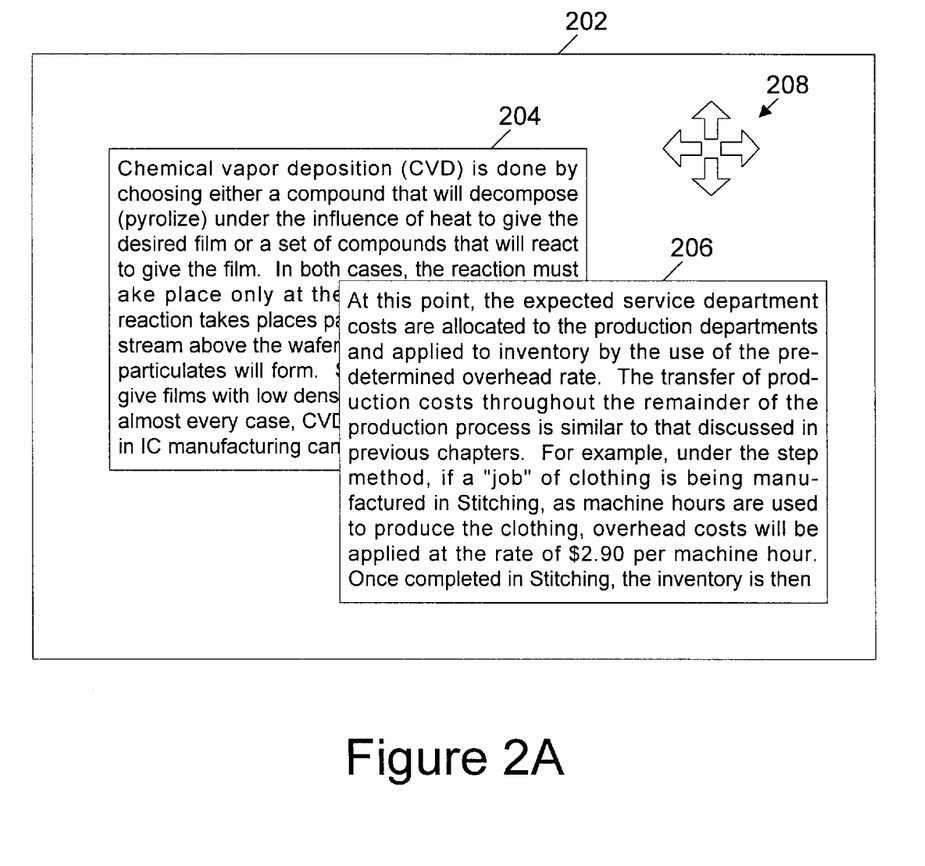
FIGS. 2A–2D are pictorial representations of a graphical user interface employing a single scrolling mechanism in accordance with a preferred embodiment of the present invention.
Figure 2B:
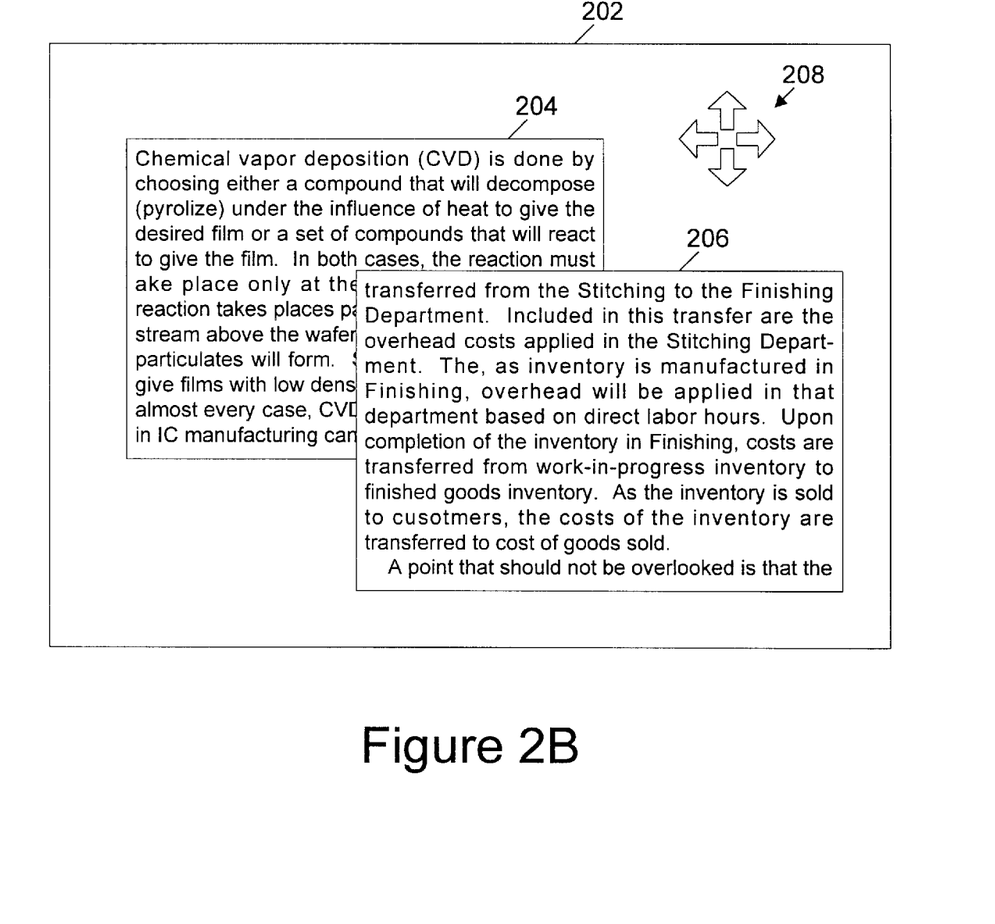
Figure 2C:
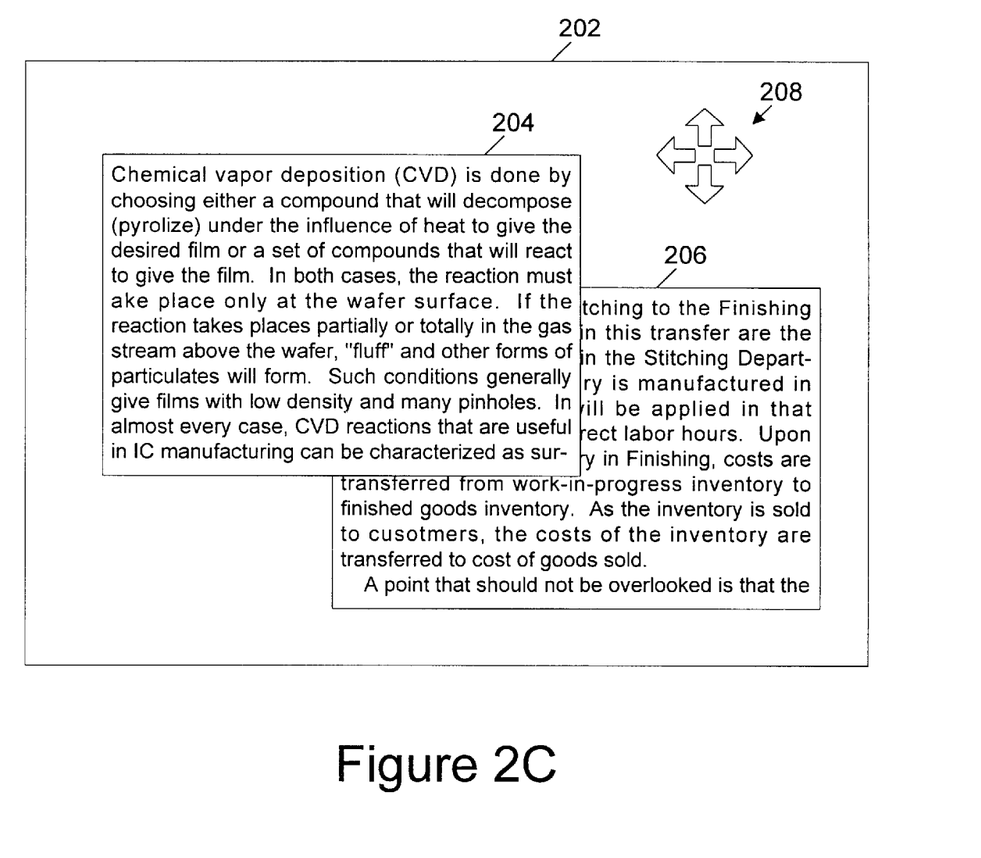

In operation, a user manipulates a cursor to place it on one of the scrolling direction indicators within the graphical device 208 using a pointing device. Actuation of the pointing device (e.g., clicking a mouse button) causes the contents of active window 206 to be scrolled. Scrolling may be incremental, such as by scrolling line-by-line or in some fractional amount of the total display size in the direct of scrolling. Alternatively, scrolling may be "paged," or the display scrolled by a full display window size in the direction of scrolling, as illustrated by FIGS. 2A and 2B. Scrolling within an active windows has no effect on the remaining inactive windows in the display.

When a different window 204 within the display area 202 becomes active, the scrolling control mechanism operates on that window without affecting other (inactive) windows. Most operating systems with graphical user interfaces provide a key sequence (i.e. "Alt-Tab" or "Ctrl-Enter") which allows the active window selection to be switched between a plurality of windows within a graphical user interface. Thus, the user need not move the pointing device or cursor to switch between display windows and control scrolling in any presently active window.

The display of the scrolling control may be persistent, or always shown, or may be contingent on whether the currently active window is scrollable. This option may be a user modifiable property with a default setting of "always shown." Always showing the complete scrolling control mechanism is preferred for usability considerations. When always shown, the active state of being able to scroll and the inactive state of not being able to scroll for a scrolling indicator would be reflected by visual cues. Such visual cues include, but are not limited to, highlighting, bolding, greying out, Lading, or other conventional techniques.

If the operating system is capable of supporting multiple active windows at any given time, the scrolling control mechanism may control scrolling in each active window simultaneously, with the contents of each with scrolling in tandem. Moreover, the scrolling control mechanism may operate in response to input from the keyboard arrow keys, not just from the pointing device.

The scrolling control mechanism represented by graphical device 206 is preferably an object forming part of the operating system. Existing object classes and application programming interface (API) calls in presently available operating systems may be employed to create the scrolling control mechanism. The object implementing the scrolling control mechanism controls the display of information within an active window in the graphical user interface as described below.

Figure 2D:
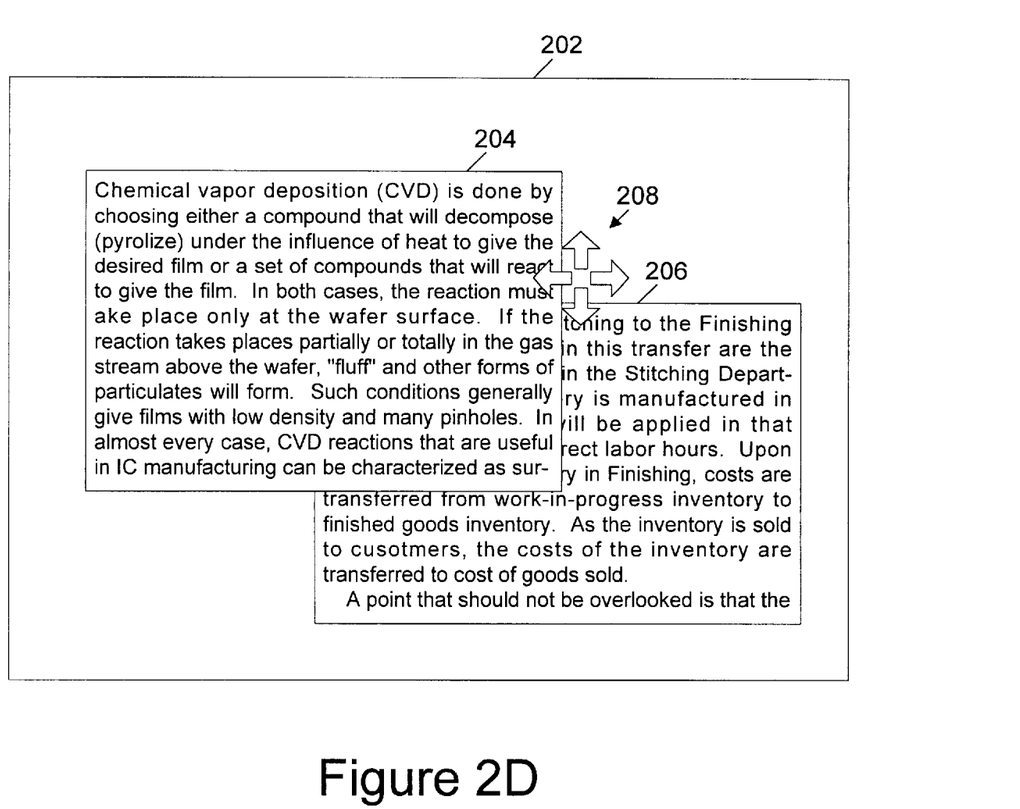

As illustrated in FIG. 2D, the graphical representation 208 of the scrolling control mechanism may be made a "float-on-top" type of graphical device. One example of such a graphical device is the OS/2 ToolBar. Thus a user may place the graphical device 208 at any convenient location within the total display area 202. Within existing operating systems, the graphical device 208 may form a part of existing user interface controls. For example, the graphical device may be a tear-off portion of the OS/2 ToolBar in OS/2 Warp™, or a part of the taskbar in Windows 95™. For the OS/2 implementation, the scrolling mechanism may be implemented as an instance of a tear-off drawer for the ToolBar. The size of the graphical device may also be subject to alteration by the user as a user modifiable property, using conventional techniques.

As an object, the scrolling control mechanism enjoys the benefits of inheritance. Thus, the appearance of the graphical device 208 representing the scrolling control mechanism may be customized by employing a specific background bitmap for a general pattern of mouse-event response regions. For example, a display window for an instance of Netscape Navigator, a product of Netscape Communications Corporation in Mountain View, Calif., may alter the graphical device 208 to have the appearance of a ship's wheel, similar to the product logo.

Figure 3:
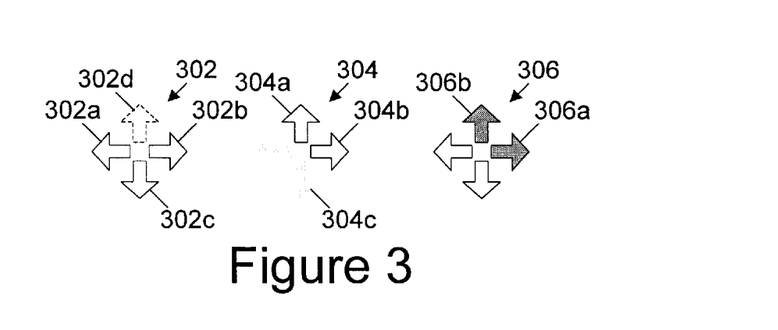
FIG. 3 depicts pictorial representations of graphical devices for a scrolling control mechanism in accordance with a preferred embodiment of the present invention.

With reference now to FIG. 3, pictorial representations of graphical devices for a scrolling control mechanism in accordance with a preferred embodiment of the present invention are depicted. A graphical device 302 or 304 representing a single scrolling control mechanism as described may provide active scrolling indicators 302a–302c or 304a–304b only in directions in which additional information is available for display. Scrolling indicators 302d, 304c for directions in which no additional information may be viewed by scrolling are preferably visually altered, such as by dashed or faded outlines or by shadowing the indicator. Alternatively, a graphical device 306 may highlight scrolling indicators 306a–306b in directions in which additional information is available for display.

Scrolling indicators within the graphical device for the scrolling control mechanism serve both to inform the user of directions in which scrolling may reveal additional information and provide a control for the user to initiate scrolling in a given direction. Either the fact of their appearance or some attribute of their appearance could be modified by the scrolling control mechanism to enable these functions.

Figure 4:
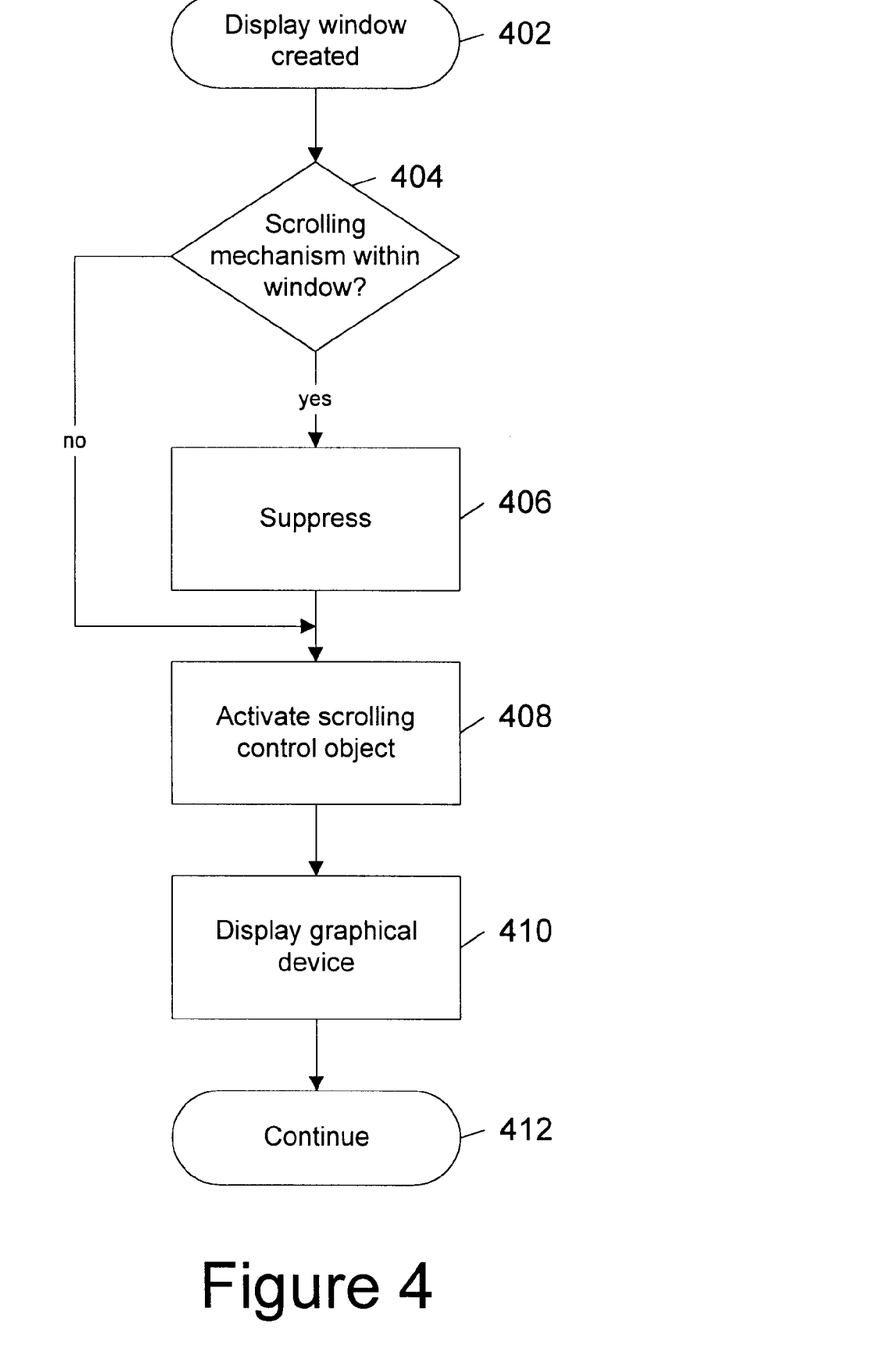
FIG. 4 is a high level flowchart for a process of providing a single scrolling control mechanism in accordance with a preferred embodiment of the present invention.

Referring to FIG. 4, a high level flowchart for a process of providing a single scrolling control mechanism in accordance with a preferred embodiment of the present invention is illustrated. The process begins at step 402, which depicts a display window for an application being created within a graphical user interface. The process then passes to step 404, which illustrates a determination of whether a scrolling mechanism such as scroll bars already exists within the display window. If so, the process passes to step 406, which depicts suppressing the existing scrolling control mechanism.

If no preexisting scrolling control mechanism is detected, the process passes instead to step 408, which illustrates activating the scrolling control object for the operation system. The process next passes to step 410, which depicts displaying a graphical device for indicating directions of scrolling and providing scroll controls as described above, and then to step 412, which depicts the operating system continuing with a subsequent task.

Figure 5:
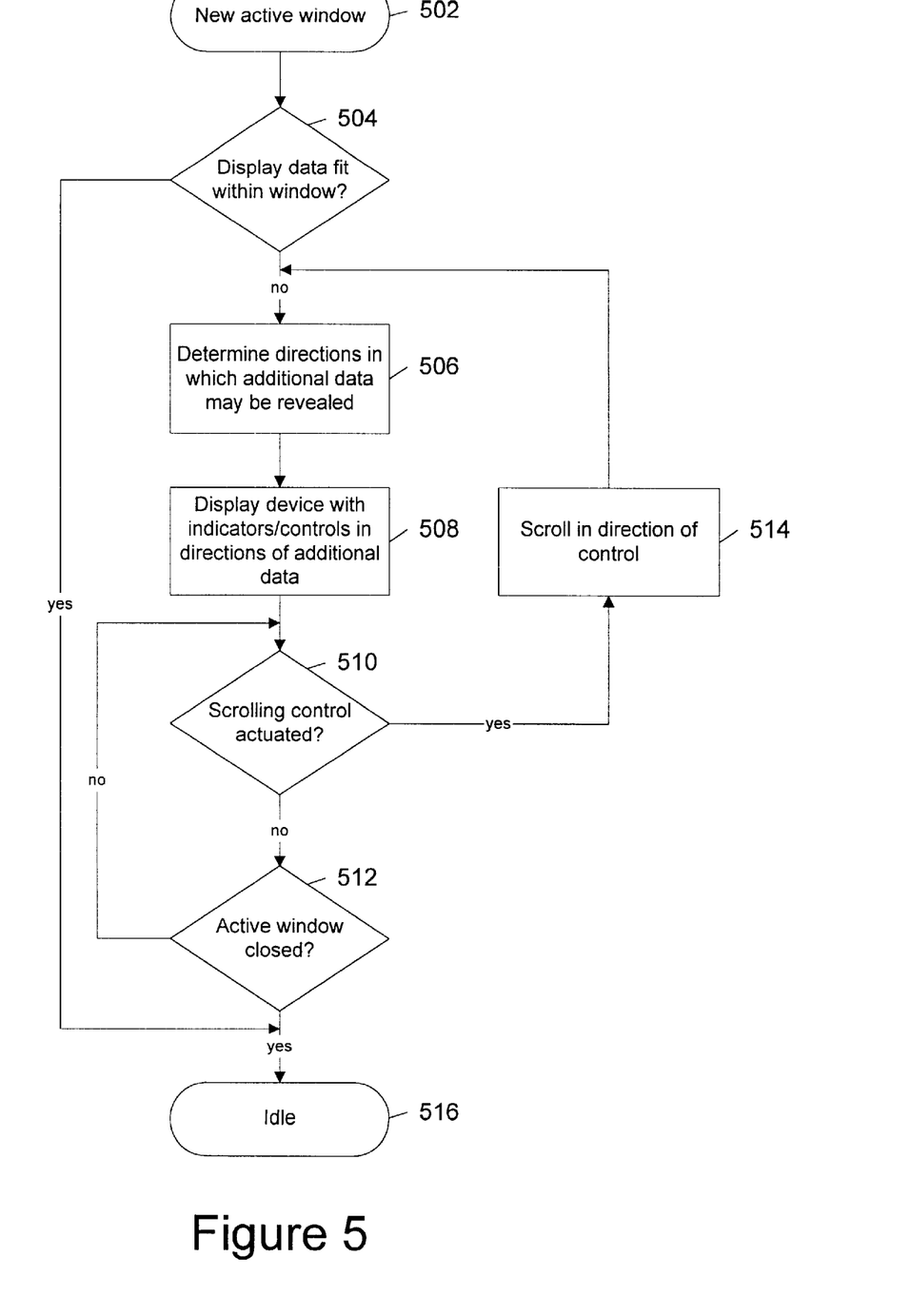
FIG. 5 depicts a high level flowchart for a process of utilizing a single scrolling control mechanism in accordance with a preferred embodiment of the present invention.

With reference to FIG. 5, a high level flowchart for a process of utilizing a single scrolling control mechanism in accordance with a preferred embodiment of the present invention is depicted. The process begins at step 502, which depicts a new window becoming the active window or obtaining the "focus" of the operating system. This may occur in response to creation of a display window, as described above with respect to step 402 in FIG. 4, or simply changing between existing display windows.

From step 502, the process passes to step 504, which illustrates a determination of whether all display data will fit within the active window. If so, the process proceeds directly to step 514, which illustrates the process becoming idle until another display window becomes the active window in the graphical user interface.

If the display data will not fit within the display window, the process proceeds instead to step 506, which depicts a determination of which directions scrolling may reveal additional data. The process then passes to step 508, which illustrates displaying the graphical device with indicators/controls in the directions in which additional data may be revealed by scrolling.

The process then passes to steps 510 and 512, which illustrate polling to determine whether either the scrolling control mechanism has been actuated or the active window has been closed. If the scrolling control mechanism has been actuated, such as by a user positioning a cursor over a scrolling control indicator and actuating a pointing device, or by a user pressing an arrow key, the process passes to step 514, which depicts scrolling the display in the direction of the indicator/control which was actuated.

Once the scrolling of the display window in response to actuation of the scrolling control mechanism is complete, the process then passes back to step 506 for a new determination of the directions in which additional information may be revealed by scrolling and subsequently altering of the appearance of the graphical device representing the scrolling control mechanism, if necessary.

Referring again to step 512, if the active window is closed, the process passes to step 514, which illustrates the process becoming idle until again required. Where only one display window of a plurality of display windows is closed, one of the remaining display windows is likely to become the new active display window by default, as a result of some ordering hierarchy. Therefore, the process likely restarts with respect to one of the remaining display windows.

The present invention simplifies a graphical user interface and provides opportunities to create more attractive display windows by eliminating the need for scroll bars. Borderless display windows may thus be supported by the operating system. The display area may be cleaner, with less total real estate devoted to a scrolling control mechanism. The graphical representation of the scrolling control mechanism may be made a more aesthetic contribution to the overall visual design of the graphical user interface, and may be customized for different user applications.

The visual device employed for a scrolling control mechanism is also subject to customization by individual users. For example, a particular user may including a display of the present time as a part of the graphical device. The user can also control the size and position of the graphical device through conventional drag-and-drop and property setting features provided.

The present invention may be implemented in conjunction with existing operating systems as a plug-in, suppressing display of scroll bars and intercepting API calls to the existing scroll control mechanisms of an operating system. The design allows integral presentation of an indicator for the directions in which scrolling may cause additional data to be displayed and a control for actuating a scrolling mechanism scrolling the display in that direction.

With the present invention, scrolling may be performed in any display window without movement of a pointing device when switching between noncontiguous display windows. The operation of the scrolling mechanism may be made to emulate the real world experiences of a user, making the scrolling control mechanism more intuitive and less of a distraction to the user.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of providing a scrolling control mechanism in a graphical user interface to a data processing system, comprising:

detecting an active display window in which additional data may be displayed by scrolling;

displaying a graphical device independent of said active display window in the graphical user interface, wherein said graphical device represents a scrolling mechanism and includes at least one scrolling indicator providing a user control for said scrolling mechanism; and responsive to a user actuating said scrolling mechanism, scrolling data in said active display window, wherein a single scrolling mechanism for any active window in a graphical user interface is provided.

2. The method of claim 1, further comprising:

responsive to a change in active display windows, determining whether additional data may be displayed by scrolling a new active display window; and responsive to determining that additional data may be displayed by scrolling said new active display window, displaying said graphical device representing said scrolling mechanism with at least one scrolling indicator.

3. The method of claim 1, further comprising:

responsive to a change in active display windows, determining whether additional data may be displayed by scrolling a new active display window; and responsive to determining that additional data may not be displayed by scrolling said new active display window, displaying said graphical device representing said scrolling mechanism with no active scrolling indicators.

4. The method of claim 2, wherein the step of displaying a graphical device further comprises:

displaying a plurality of scrolling indicators, each scrolling indicator indicating a different direction in which additional data may be displayed by scrolling and providing a user control for scrolling said active display window in a respective direction.

5. The method of claim 2, further comprising:

providing an operating system object encapsulating said scrolling mechanism, said object including an attribute controlling appearance of said graphical device.

6. The method of claim 2, wherein the step of displaying a graphical device further comprises:

displaying a graphical device on top of any active display window and a background in said graphical user interface, a highlighted portion of said graphical device forming said at least one scrolling indicator.

7. The method of claim 1, further comprising:

responsive to a change in active display windows, determining whether additional data may be displayed by scrolling a new active display window in any direction; and responsive to determining that additional data may be displayed by scrolling said new active display window in at least one direction, displaying at least one scrolling indicator indicating a direction in which additional data may be displayed by scrolling and providing a user control for scrolling said active display window in a said direction.

8. The method of claim 7, wherein said step of displaying at least one scrolling indicator further comprises:

displaying a plurality of scrolling indicators, each scrolling indicator indicating a different direction in which additional data may be displayed by scrolling and providing a user control for scrolling said active display window in a respective direction.

9. A method of scrolling borderless display windows in a data processing system graphical user interface display, comprising:

determining whether additional information may be viewed in an active display window by scrolling in any direction;

responsive to determining that additional information may be viewed in said active display window by scrolling in at least one direction, displaying at least one active scrolling indicator detached from said active display window and providing a control for scrolling said active display window in said at least one corresponding direction.

10. The method of claim 9, further comprising:

responsive to determining that additional information may be viewed in said active display window by scrolling in a plurality of directions, displaying a plurality of active scrolling indicators, each active scrolling indicator providing a control for scrolling said active display window in a different direction within said plurality of directions.

11. The method of claim 9, further comprising:

responsive to determining that additional information may not be viewed in said active display window by scrolling in at least one direction, displaying at least one inactive scrolling indicator having a visual appearance differing from said active scrolling indicator.

12. The method of claim 11, wherein said step of displaying at least one inactive scrolling indicator further comprises:

displaying a faded scrolling indicator.

13. The method of claim 11, wherein said step of displaying at least one inactive scrolling indicator further comprises:

displaying a scrolling indicator with a dashed outline.

14. The method of claim 11, wherein said step of displaying at least one inactive scrolling indicator having a visual appearance differing from said active scrolling indicator further comprises:

highlighting said active scrolling indicator.

15. The method of claim 9, further comprising:

responsive to determining that additional information may not be viewed in said active display window by scrolling in a plurality of directions, displaying a plurality of inactive scrolling indicators, each inactive scrolling indicator corresponding to a different direction within said plurality of directions and having a visual appearance differing from said active scrolling indicator.

16. The method of claim 9, wherein said step of displaying at least one active scrolling indicator further comprises:

displaying an active scrolling indicator as part of an OS/2 ToolBar.

17. The method of claim 9, wherein said step of displaying at least one active scrolling indicator further comprises:

displaying an active scrolling indicator with a user modifiable size.

18. The method of claim 9, wherein said step of displaying at least one active scrolling indicator further comprises:

displaying an active scrolling indicator with a user modifiable position in said display.

19. The method of claim 9, wherein said step of displaying at least one active scrolling indicator further comprises:

displaying an active scrolling indicator which floats on top of said active display window in said display.

20. An apparatus for scrolling borderless display windows in a data processing system graphical user interface display, comprising:

determination means for determining whether additional information may be viewed in an active display window by scrolling in any direction;

display means, responsive to determining that additional information may be viewed in said active display window by scrolling in at least one direction, for displaying at least one active scrolling indicator detached from said active display window and providing a control for scrolling said active display window in said at least one direction.

21. The apparatus of claim 20, further comprising:

display means, responsive to determining that additional information may be viewed in said active display window by scrolling in a plurality of directions, for displaying a plurality of active scrolling indicators, each active scrolling indicator providing a control for scrolling said active display window in a different direction within said plurality of directions.

22. The apparatus of claim 20, further comprising:

display means, responsive to determining that additional information may not be viewed in said active display window by scrolling in at least one direction, for displaying at least one inactive scrolling indicator having a visual appearance differing from said active scrolling indicator.

23. The apparatus of claim 20, further comprising:

display means, responsive to determining that additional information may not be viewed in said active display window by scrolling in a plurality of directions, for displaying a plurality of inactive scrolling indicators, each inactive scrolling indicator corresponding to a different direction within said plurality of directions and having a visual appearance differing from said active scrolling indicator.

24. A computer program product for use with a data processing system, comprising:

a computer usable medium;

first instructions on said computer usable medium for determining whether additional information may be viewed in an active display window by scrolling in any direction; and second instructions on said computer usable medium, responsive to determining that additional information may be viewed in said active display window by scrolling in at least one direction, for displaying at least one active scrolling indicator detached from said active display window and providing a control for scrolling said active display window in said at least one direction.

25. The computer program product of claim 24, further comprising:

fourth instructions on said computer usable medium, responsive to determining that additional information may be viewed in said active display window by scrolling in a plurality of directions, for displaying a plurality of active scrolling indicators, each active scrolling indicator providing a control for scrolling said active display window in a different direction within said plurality of directions.

26. The computer program product of claim 24, further comprising:

fifth instructions on said computer usable medium, responsive to determining that additional information may not be viewed in said active display window by scrolling in at least one direction, for displaying at least one inactive scrolling indicator having a visual appearance differing from said active scrolling indicator.

27. The computer program product of claim 24, further comprising:

sixth instructions on said computer usable medium, responsive to determining that additional information may not be viewed in said active display window by scrolling in a plurality of directions, for displaying a plurality of inactive scrolling indicators, each inactive scrolling indicator corresponding to a different direction within said plurality of directions and having a visual appearance differing from said active scrolling indicator.

28. The method of claim 9, further comprising:

displaying a graphical device detached from a plurality of active windows in said graphical user interface, said graphical device including said at least one active scrolling indicator and a plurality of other scrolling indicators selected from the group consisting of active scrolling indicators and inactive scrolling indicators, said active scrolling indicators indicating that additional information may be viewed in said active display window by scrolling in a corresponding direction and providing a control for scrolling said active display window in said corresponding direction, and said inactive scrolling indicators indicating that additional information may not be viewed in said active display window by scrolling in a corresponding direction.

29. The method of claim 28, wherein said step of displaying a graphical device further comprises:

displaying a graphical device having a user modifiable position within said graphical user interface.

30. The method of claim 28, wherein said step of displaying a graphical device further comprises:

displaying a graphical device having a user modifiable size.

31. The method of claim 28, wherein said active display window comprises a first active display window, the method further comprising:

responsive to a change in active display windows from said first active display window to a second active display window, determining whether additional information may be viewed in said second active display window by scrolling in any direction;

responsive to determining that additional information may be viewed in said second active display window by scrolling in at least one direction, displaying, within said graphical device, at least one active scrolling indicator providing a control for scrolling said second active display window in said at least one direction and a plurality of said other scrolling indicators.

32. The method of claim 31, wherein said step of displaying said graphical device further comprises:

displaying, within said graphical device, an active scrolling indicator for each direction in which additional information may be viewed by scrolling; and displaying, within said graphical device, an inactive scrolling indicator for each direction in which additional information may not be viewed by scrolling.

33. The method of claim 31, further comprising:

responsive to said change in active display windows, changing a background appearance of said graphical device.

34. The method of claim 9, further comprising:

responsive to a user actuating said at least one scrolling indicator, scrolling said active display window in said at least one corresponding direction.

35. The method of claim 34, wherein said step of scrolling said active display window further comprises:

scrolling said active display window in response to actuation of an input device selected from the group consisting of a keyboard key and a pointing device.

* * * * *

UNITED STATES PATENT AND TRADEMARK OFFICE
CERTIFICATE OF CORRECTION

| | |
|---|---|
| PATENT NO. | : 5,999,176 |
| DATED | : December 7, 1999 |
| INVENTOR(S) | : Kamper |

It is certified that error appears in the above-identified patent and that said Letters Patent is hereby corrected as shown below:

<u>Column 4,</u>
Line 23, please change "Lading" to --fading--.

Signed and Sealed this

Twenty-sixth Day of June, 2001

*Attest:*

*Attesting Officer*

NICHOLAS P. GODICI
*Acting Director of the United States Patent and Trademark Office*